United States Patent
Diller et al.

(10) Patent No.: US 8,700,614 B1
(45) Date of Patent: Apr. 15, 2014

(54) METHOD OF AND A SYSTEM FOR RANKING MEMBERS WITHIN A SERVICES EXCHANGE MEDIUM

(75) Inventors: Jonathan Paul Diller, Soquel, CA (US); Sunny SunMin Song, Los Altos, CA (US)

(73) Assignee: Elance, Inc., Mountain View, CA (US)

( * ) Notice: Subject to any disclaimer, the term of this patent is extended or adjusted under 35 U.S.C. 154(b) by 172 days.

(21) Appl. No.: 12/755,304

(22) Filed: Apr. 6, 2010

Related U.S. Application Data (63) Continuation-in-part of application No. 12/287,994, filed on Oct. 14, 2008, now Pat. No. 8,380,709.

(51) Int. Cl.
*G06F 7/00* (2006.01)
*G06F 17/30* (2006.01)

(52) U.S. Cl.
USPC .......................................... 707/723; 707/748

(58) Field of Classification Search
USPC ......... 707/706, 723, 733, 748, 758, 722, 752, 707/999.003, 999.007
See application file for complete search history.

(56) References Cited

U.S. PATENT DOCUMENTS

| | | | |
|---|---|---|---|
| 4,703,325 A | 10/1987 | Chamberlin et al. | |
| 4,799,156 A | 1/1989 | Shavit et al. | 705/26 |
| 5,008,853 A | 4/1991 | Bly et al. | 715/751 |
| 5,220,657 A | 6/1993 | Bly et al. | |
| 5,548,506 A | 8/1996 | Srinivasan | |
| 5,557,515 A | 9/1996 | Abbruzzese et al. | |
| 5,592,620 A | 1/1997 | Chen et al. | |
| 5,664,115 A | 9/1997 | Fraser | 705/37 |
| 5,715,402 A | 2/1998 | Popolo | 705/37 |
| 5,732,400 A | 3/1998 | Mandler et al. | 705/26 |
| 5,794,207 A | 8/1998 | Walker et al. | 705/77 |
| 5,835,896 A | 11/1998 | Fisher et al. | 705/37 |
| 5,842,178 A | 11/1998 | Giovannoli | 705/26 |
| 5,862,223 A | 1/1999 | Walker et al. | 705/50 |
| 5,905,975 A | 5/1999 | Ausubel | 705/37 |
| 5,924,082 A | 7/1999 | Silverman et al. | 705/37 |
| 5,949,976 A | 9/1999 | Chappelle | |

(Continued)

FOREIGN PATENT DOCUMENTS

| | | | |
|---|---|---|---|
| EP | 0 952 536 A1 | 10/1999 | G06F 17/60 |
| WO | WO 01/73645 A1 | 10/2001 | G06F 17/60 |

OTHER PUBLICATIONS morebusiness.com, "How to Write Winning Business Proposals: Writing Strategies," Office Action dated Oct. 6, 2011, <http://www.morebusiness.com/running_your_business/management/v1n11.brc>, published Aug. 1, 1998.

(Continued)

*Primary Examiner* — Md. I Uddin
(74) *Attorney, Agent, or Firm* — Haverstock & Owens LLP (57) ABSTRACT

A method of and a system for ranking users by activity level and achievements within the services exchange medium (SEM) enables better searching for a service provider. An activity score for each service provider is periodically determined. The activity score is based on a point scheme. The point scheme, which is tunable, drives particular behaviors within the SEM by rewarding points for a first set of activities and taking away points for a second set of activities. Upon receiving a query, a total score, which is dependent at least in part on the activity score, is calculated. The results list is sorted based on the total score.

20 Claims, 5 Drawing Sheets

(56) References Cited

U.S. PATENT DOCUMENTS

| | | | | |
|---|---|---|---|---|
| 5,956,715 A | 9/1999 | Glasser et al. | ................. | 1/1 |
| 5,966,130 A | 10/1999 | Benman, Jr. | | |
| 5,987,498 A | 11/1999 | Athing et al. | ................. | 709/203 |
| 6,009,154 A | 12/1999 | Rieken et al. | ............ | 379/114.12 |
| 6,041,307 A | 3/2000 | Ahuja et al. | ................. | 705/8 |
| 6,049,777 A | 4/2000 | Sheena et al. | ................. | 705/10 |
| 6,061,665 A | 5/2000 | Bahreman | ................. | 705/40 |
| 6,064,980 A | 5/2000 | Jacobi et al. | ................. | 705/26 |
| 6,078,906 A | 6/2000 | Huberman | ................. | 705/37 |
| 6,092,049 A | 7/2000 | Chislenko et al. | ................. | 705/10 |
| 6,101,482 A | 8/2000 | DiAngelo et al. | ................. | 705/26 |
| 6,119,101 A | 9/2000 | Peckover | ................. | 705/26 |
| 6,119,149 A | 9/2000 | Notani | | |
| 6,128,624 A | 10/2000 | Papierniak et al. | ................. | 1/1 |
| 6,141,653 A | 10/2000 | Conklin et al. | ................. | 705/80 |
| 6,154,731 A | 11/2000 | Monks et al. | ................. | 705/36 R |
| 6,161,099 A | 12/2000 | Harrington et al. | ................. | 705/36 R |
| 6,208,659 B1 | 3/2001 | Govindarajan et al. | | |
| 6,223,177 B1 | 4/2001 | Tatham et al. | ................. | 1/1 |
| 6,226,031 B1 | 5/2001 | Barraclough et al. | | |
| 6,233,600 B1 | 5/2001 | Salas et al. | ................. | 709/201 |
| 6,311,178 B1 | 10/2001 | Bi et al. | ................. | 707/706 |
| 6,336,105 B1 | 1/2002 | Conklin et al. | ................. | 705/80 |
| 6,374,292 B1 | 4/2002 | Srivastava et al. | ................. | 709/206 |
| 6,415,270 B1 | 7/2002 | Rackson et al. | ................. | 705/36 R |
| 6,442,528 B1 | 8/2002 | Notani et al. | ................. | 705/9 |
| 6,484,153 B1 | 11/2002 | Walker et al. | ................. | 705/38 |
| 6,557,035 B1 | 4/2003 | McKnight | | |
| 6,564,246 B1 | 5/2003 | Varma et al. | ................. | 709/205 |
| 6,567,784 B2 | 5/2003 | Bukow | ................. | 705/9 |
| 6,598,026 B1 | 7/2003 | Ojha et al. | ................. | 705/26 |
| 6,832,176 B2 | 12/2004 | Hartigan et al. | | |
| 6,859,523 B1 | 2/2005 | Jilk et al. | | |
| 6,871,181 B2 | 3/2005 | Kansal | ................. | 705/26 |
| 7,310,415 B1 | 12/2007 | Short | | |
| 7,406,443 B1 | 7/2008 | Fink et al. | | |
| 7,437,327 B2 | 10/2008 | Lam et al. | | |
| 7,444,374 B1 | 10/2008 | Baker | | |
| 7,587,336 B1 | 9/2009 | Wallgreen et al. | ................. | 705/26 |
| 8,024,225 B1 | 9/2011 | Sirota et al. | | |
| 8,224,755 B2 * | 7/2012 | Goodman et al. | ................. | 705/317 |
| 8,380,709 B1 | 2/2013 | Diller et al. | | |
| 2001/0011222 A1 | 8/2001 | McLauchlin et al. | ................. | 705/7 |
| 2001/0034688 A1 | 10/2001 | Annunziata | | |
| 2001/0041988 A1 | 11/2001 | Lin | | |
| 2002/0010685 A1 | 1/2002 | Ashby | | |
| 2002/0023046 A1 | 2/2002 | Callahan et al. | ................. | 705/37 |
| 2002/0032576 A1 | 3/2002 | Abbott et al. | | |
| 2002/0120522 A1 | 8/2002 | Yang | ................. | 705/26 |
| 2002/0120554 A1 | 8/2002 | Vega | | |
| 2002/0129139 A1 | 9/2002 | Ramesh | | |
| 2002/0133365 A1 | 9/2002 | Grey et al. | | |
| 2002/0194077 A1 | 12/2002 | Dutta | | |
| 2002/0194112 A1 * | 12/2002 | dePinto et al. | ................. | 705/37 |
| 2003/0046155 A1 | 3/2003 | Himmel et al. | | |
| 2003/0055780 A1 | 3/2003 | Hansen et al. | | |
| 2003/0101126 A1 | 5/2003 | Cheung et al. | | |
| 2003/0191684 A1 | 10/2003 | Lumsden et al. | | |
| 2003/0220843 A1 | 11/2003 | Lam et al. | | |
| 2004/0063463 A1 | 4/2004 | Boivin | | |
| 2004/0122926 A1 | 6/2004 | Moore et al. | | |
| 2004/0128224 A1 | 7/2004 | Dabney et al. | | |
| 2004/0215560 A1 | 10/2004 | Amalraj et al. | | |
| 2004/0230511 A1 | 11/2004 | Kannan et al. | | |
| 2005/0043998 A1 | 2/2005 | Bross et al. | | |
| 2006/0031177 A1 | 2/2006 | Rule | | |
| 2006/0122850 A1 | 6/2006 | Ward et al. | | |
| 2006/0136324 A1 | 6/2006 | Barry et al. | | |
| 2006/0155609 A1 * | 7/2006 | Caiafa | ................. | 705/26 |
| 2006/0195428 A1 | 8/2006 | Peckover | | |
| 2006/0212359 A1 | 9/2006 | Hudgeon | ................. | 705/26 |
| 2007/0027746 A1 | 2/2007 | Grabowich | | |
| 2007/0027792 A1 | 2/2007 | Smith | | |
| 2007/0067196 A1 | 3/2007 | Usui | | |
| 2007/0078699 A1 | 4/2007 | Scott et al. | | |
| 2007/0162379 A1 | 7/2007 | Skinner | | |
| 2007/0174180 A1 | 7/2007 | Shin | | |
| 2007/0192130 A1 | 8/2007 | Sandhu | | |
| 2007/0233510 A1 | 10/2007 | Howes | | |
| 2008/0059523 A1 | 3/2008 | Schmidt et al. | | |
| 2008/0065444 A1 | 3/2008 | Stroman et al. | | |
| 2008/0082662 A1 * | 4/2008 | Dandliker et al. | ................. | 709/225 |
| 2008/0109491 A1 * | 5/2008 | Gupta | ................. | 707/104.1 |
| 2008/0134292 A1 | 6/2008 | Ariel et al. | | |
| 2008/0154783 A1 | 6/2008 | Rule et al. | | |
| 2008/0187114 A1 | 8/2008 | Altberg et al. | | |
| 2008/0294631 A1 * | 11/2008 | Malhas et al. | ................. | 707/5 |
| 2009/0011395 A1 | 1/2009 | Schmidt et al. | | |
| 2009/0017788 A1 | 1/2009 | Doyle et al. | | |
| 2009/0055404 A1 | 2/2009 | Heiden et al. | | |
| 2009/0055476 A1 | 2/2009 | Markus et al. | | |
| 2009/0116403 A1 | 5/2009 | Callanan et al. | | |
| 2009/0132345 A1 | 5/2009 | Meyssami et al. | | |
| 2009/0177691 A1 | 7/2009 | Manfredi et al. | | |
| 2009/0199185 A1 * | 8/2009 | Slawson et al. | ................. | 718/100 |
| 2009/0210282 A1 * | 8/2009 | Elenbaas et al. | ................. | 705/9 |
| 2009/0234706 A1 | 9/2009 | Adams et al. | | |
| 2009/0287592 A1 | 11/2009 | Brooks et al. | | |
| 2010/0017253 A1 | 1/2010 | Butler et al. | | |
| 2010/0115040 A1 * | 5/2010 | Sargent et al. | ................. | 709/206 |
| 2010/0191591 A1 | 7/2010 | Silbert | | |
| 2011/0238505 A1 | 9/2011 | Chiang et al. | | |
| 2011/0302053 A1 | 12/2011 | Rigole | | |

OTHER PUBLICATIONS

Non-Final Office Action dated Nov. 8, 2010, U.S. Appl. No. 12/476,069, filed Jun. 1, 2009, Ved Ranjan Sinha et al.

Shalil Majithia et al, "Reputation-based Semantic Service Discovery", IEEE Computer Society,13th IEEE International Workshops on Enabling Technologies:Infrastructure for Collaborative Enterprises, 2004, pp. 1-6.

Ziqiang Xu et al, "Reputation-Enhanced QoS-based Web Services Discovery", School of Computing, Queen's University, Canada, 2007, pp. 1-8.

Davenport, Thomas H. and Keri Pearlson, "Two Cheers for the Virtual Office", summer 1998, abstract, retrieved from the Internet: <URL: http://www.pubservice.com/MSStore?ProductDetails.aspx?CPC=3944>.

PCT International Search Report and Written Opinion, PCT/US06/22734, Jun. 3, 2008, 5 pages.

Massimo Paolucci et al. "Semantic Matching of Web Services Capabilities" Carnegie Mellon University, 2002, Springer-Verlag Berlin Heidelberg, p. 333-347.

ants.com web pages [online]. Ants.com [retrieved on Aug. 22, 2008]. Retrieved from the Internet: <URL: http://www.ants.com/ants/>.

bizbuyer.com web pages [online]. BizBuyer.com, Inc. [retrieved Aug. 18-21, 2000]. Retrieved from the Internet: <URL: http://www.bizbuyer.com/>.

BullhornPro web pages [online]. Bullhorn, Inc. [retrieved on Jan. 4, 2001]. Retrieved from the Internet: <URL: http://www.bullhornpro.com/>.

Cassidy, M., "Going for Broke," San Jose Mercury News, Monday, Aug. 16, 1999, pp. 1E and 4E, published in San Jose, CA.

efrenzy.com web pages [online]. eFrenzy, Inc. [retrieved on Aug. 22, 2000]. Retrieved from the Internet: <URL: http://www.efrenzy.com/index.isp>.

Eisenberg, D. "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.

eworkexchange.com web pages [online]. eWork Exchange, Inc. [retrieved on Aug. 18-22, 2000]. Retrieved from the Internet: <URL: http://www.eworks.com/>.

eWork Exchange web pages [online]. eWork Exchange, Inc. [retrieved on Jan. 5, 2001]. Retrieved from the Internet: <URL: http://www.eworks.com/>.

eWork ProSource web pages [online]. eWork Exchange, Inc. [retrieved on Jan. 3, 2001]. Retrieved from the Internet: <URL: http://www.ework.com/>.

(56) References Cited

OTHER PUBLICATIONS

FeeBid.com web pages [online]. FeeBid.com [retrieved on Dec. 18, 2000]. Retrieved from the Internet: <URL: http://www.feebid.com>.

freeagent.com web pages [online]. FreeAgent.com [retrieved Aug. 18-22, 2000]. Retrieved from the Internet: <URL: http://www.freeagent.com/>.

guru.com.com web pages [online]. Guru.com, Inc. [retrieved Aug. 18, 2000]. Retrieved from the Internet: <URL: http://www.guru.com/>.

Herhold, S., "Expert Advice is Collectible for Start-up," San Jose Mercury News, Monday, Aug. 16, 1999, pp. 1E and 6E, San Jose, CA.

hotdispatch.com web pages [online]. HotDispatch, Inc. [retrieved on Aug. 22, 2000]. Retrieved from the Internet: <URL: http://www.hotdispatch.com/>.

"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.

Humphreys, Paul et al., "A Just-in-Time Evaluation Strategy for International Procurement," MCB UP Limited, 1998, pp. 1-11.

imandi.com web pages [online]. Imandi Corporation [retrieved on Aug. 22, 2000]. Retrieved from the Internet: <URL: http://www.imandi.com/>.

Malone, Thomas W. et al., "The Dawn of the E-Lance Economy," Harvard Business Review, Sep.-Oct. 1998, pp. 145-152.

"Netscape Selects Netopia as the Exclusive 'Virtual Office' Offering on the New Netscape Small Business Source Service," PR Newswire, May 11, 1998, Mountain View and Alameda, California.

onvia.com web pages [online]. Onvia.com [retrieved Aug. 22, 2000]. Retrieved from the Internet: <URL: http://www.onvia.corn/usa/home/index.cfm>.

Opus360 web pages [online]. Opus360 Corporation [retrieved on Jan. 3, 2001] Retrieved from the Internet: <URL: http://www.opus360com/>.

smarterwork.com web pges [online]. smarterwork.com, Inc. [retrieved on Aug. 22, 2000]. Retrieved from the Internet: <URL: http://www.smarterwork.com/>.

workexchange.com web pages [online]. WorkExchange, Inc. [retrieved Aug. 22, 2000]. Retrieved from the Internet: <URL: http://www.workexchange.com/unique/workexchange/index1.cfm>.

madbid.com. <http://web.archive.org/eb/20080829025830http://uk.madbid.com/faq/>.

Office Action dated Sep. 19, 2012, U.S. Appl. No. 12/476,039, filed Jun. 1, 2009, Ved Ranjan Sinha et al.

* cited by examiner

Fig. 1

Escripts1234
PHP|AJAX|ASP.NET|Web 2.0|XML|Flash ~202
Profile | Portfolio | Feedback

Minimum Hourly Rate: $12/hr
Location: India

Summary ~204
Since 2003, we have worked hard on many online and software development projects. We focus on PHP, AJAX, ASP.NET and XML.

Website Development Experience ~206
Web Programming (69)
Web Design (48)
Ecommerce Website (12)

| Skills ~210 | Self-rated | Experience |
|---|---|---|
| ASP, NET | ▫▫▫▫▫▫▫▫ | 3 years |
| XHTML 1.0 | ▫▫▫▫▫▫▫▫ | 2 years |
| PHP5 | ▫▫▫▫▫▫▫▫ | 3 years |
| MySQL | ▫▫▫▫▫▫▫▫ | 4 years |
| AJAX | ▫▫▫▫▫▫▫▫ | 3 years |
| JavaScript 1.3 | ▫▫▫▫▫▫▫▫ | 5 years |

| Feedback | | |
|---|---|---|
| Last 6 months | Website Dev. | All Categories |
| Feedback: | 100% Positive | 100% Positive |
| Reviews: | 24 | 30 |
| Projects: | 55 | 65 |
| Earnings: | $78,703 | $88,803 |
| Lifetime Earnings: | $129,775 | $159,875 |

Keyword Tags ~208
• Video Sharing Website    • Dating website
• Ecommerce               • Web Design
• AJAX                    • .NET
• PHP Custom About Us ~212

Profile Type: Business
Year Founded: August 8, 2002
Number of Employees: 90

Escripts1234 has been creating high-quality web applications for over 5 years. We have developed into a company focused on Ecommerce, Web application development, Web designing and SEO.

Based on our significant experience in the IT business, we have formulated our development policies towards producing high-quality solutions for reasonable costs. Here are some of our main priniciples:
- Detailed proposals  - Expert management  - Comprehensive design specifications for all projects
- High quality graphic design  - Extensive testing by our in-house Testing Laboratory

Payment Terms
30% up-front; 40% after we show you approximately half of the work done on our server; and remaining 30% after we show you completed work but before delivery.

Detailed Service Description ~214
Since 2002 we have worked closely with our clients and their customers to ensure they leverage the highest measurable benefit and return on investment for their online and software development projects.

Our broad service offering covers the following areas:

Web Site Design & Development -
We provide a comprehensive range of highly affordable web site development services, ranging from small, static web sites to large, database-driven e-commerce sites.

Credentials ~216
Certifications
Sun Microsystems, SCJP For the JAVA2 Platform, Awarded: 2002

References
Bob Smith - Personal Reference
React Services, Director

Fig. 2

Writing & Translation ▼ 305

315 { Points [128] Last Week 118 }

Rank* 215 ↓ Last Week 196
* Out of 21,926 category members  } 310

Service Delivery 320

321 6 Month Earnings: $5,033
322 Jobs With Final Feedback: 11
323 Status Reports Submitted: 19

324 Violations: 0
325 Cancellations: 0
326 Disputes: 0

330 Improve your service delivery statistics

335

Your Rank
−0.18% ← (since last week)
Lowest ......... Highest

Client Relationships 340

341 Client Recommendations: 92%
342 Earnings per Client: $352
343 Number of Clients: 15
344 Repeat Clients: 2

350 Improve your client relationship statistics

355

Your Rank
0.08% ⇒ (since last week)
Lowest ......... Highest

Marketing 360

361 6 Month Bookings: $5,432
362 Job Accept Rate: 26%
363 Tested Skills: 8
364 Verified Credentials: 2

365 Proposals Below Budget: 4

370 Improve your marketing statistics

375

Your Rank
−0.02% ← (since last week)
Lowest ......... Highest

METHOD OF AND A SYSTEM FOR RANKING MEMBERS WITHIN A SERVICES EXCHANGE MEDIUM

RELATED APPLICATIONS

This patent application is a continuation in part of the co-pending U.S. patent application Ser. No. 12/287,994, filed Oct. 14, 2008, entitled "METHOD AND SYSTEM FOR RANKING USERS," which is hereby incorporated by reference.

FIELD OF THE INVENTION

The present invention relates to methods of and systems for ranking users. More particularly, the present invention relates to a method of and a system for ranking members within a services exchange medium.

BACKGROUND OF THE INVENTION

There are job searching sites that allow a user to search through a list of registered job seekers to find the most qualified job seeker. Typically, the job seekers register with a particular job site and provide their background and/or expertise in their profiles. The user is able to search job seekers who have experience in, for example, web programming, by entering the keyword "web programming" in a search field. The job site searches through the profiles and returns a results list of job seekers. A results list listing job seekers alphabetically is inconveniently organized as someone with a name towards the end of the alphabet, who may be well qualified, is listed at the bottom of the results list. The user has to scroll down the results list, while reviewing each result, before finally finding this person. This is troublesome and time consuming, especially if the results list is long. A results list listing job seekers based only on a keyword match also presents an inconvenience since the provider search result does not take into consideration of other important qualities that the user is seeking.

Some methods have been implemented to sort the job seekers and provide the results list in a more useful manner to users. U.S. Pat. No. 6,871,181 to Kansal teaches a method of assessing, scoring, ranking and rating technology vendors for the purpose of comparing vendor bids on a project. A score or ranking is developed for each of the vendors based upon the vendor's historical reliability as well as normalizing the vendor's ranking with respect to the other vendors for the purpose of determining the appropriate vendor. U.S. Patent App. No. 2006/0212359 to Hudgeon teaches ratings based on performance attributes such as service quality, timeliness and cost. Sites such as rentacoder.com and guru.com also use ratings which organize service providers. Rentacoder.com uses an equation which sums the cost of each job times the adjusted rating of each job minus each missed status report value. Guru.com ranks users by category and then based on feedback and money earned. While these ranking schemes are helpful in organizing data related to service providers on web sites, there are shortcomings which need to be addressed.

SUMMARY OF THE INVENTION

An object of the present invention is to provide a method of and a system for ranking within a services exchange medium. In the services exchange medium, buyers find and hire service providers "on demand" to get projects done quickly and cost effectively. Buyers can post projects and search for service providers. Service providers can search for projects to work on.

In one aspect, a computerized method of generating a results list includes periodically determining an activity score for each service provider and, upon receiving a query, calculating a total score based at least in part on the activity score. The activity score is typically based on a point scheme, wherein the point scheme increments points for a first set of activities and decrements points for a second set of activities within the services exchange medium. In some embodiments, the first set of activities includes using tools provided by and within the services exchange medium to complete jobs successfully, receiving feedback, and getting paid through the services exchange medium. In some embodiments, the second set of activities includes violating policies, engaging in disputes with other members, and submitting proposals below budget. The activity score is typically stored on a computing device. Prior to the step of calculating, the method includes determining a search score for each service provider based on the query. If the query is a user-entered search text, then the search score depends on a number of matches between the user-entered search text and a professional profile and where the matches are located within the professional profile; the total score is a combination of the search score and the activity score. If the query is a system generated query to search for all service providers, then search score is set to a default value such that the activity score is a final determiner of rank in a results list. If the query is a system generated query to search for service providers associated with a job category, then the search score is set to a default value such that the activity score is a final determiner of rank in a results list. The method also includes sorting a results list based on the total score. In some embodiments, services providers associated with more than one job category are listed once in the results list. In some embodiments, the point scheme is tunable.

In another aspect, a computerized method to determine rank of service providers includes, for each service provider within each job category, calculating an activity score based on a point scheme, wherein the point scheme drives particular behaviors within a services exchange medium by adding points to and subtracting points away from a service provider. The method also includes, determining a search score upon receiving a search query, and combining the activity score with the search score, thereby resulting in a total score. The total score typically establishes a rank position of the service provider among service providers returned in a first results list. In some embodiments, the search query is a user-entered search text, and the search score depends on a number of matches between the user-entered search text and a professional profile and where the matches are located within the professional profile. In some embodiments, the search query is a system generated query, and the search score is set to a default value such that the activity score is a final determiner of the rank position in the first results list. The service providers returned in the first results list are associated with a job category or, alternatively, are from all job categories. In some embodiments, the activity score establishes a different rank position in a second results list than the rank position in the first results list. In some embodiments, the point scheme is tunable. In some embodiments, a service provider associated with more than one job has more than one activity score, wherein the combining includes selecting the highest activity score to determine the total score.

In yet another aspect, a system for generating a provider results list comprises a processor and an application executed by the processor. The application periodically determines an activity score for each service provider and, upon receiving a query, calculates a total score based at least in part on the activity score. In some embodiments, the application is executed online. The activity score is typically based on a point scheme, wherein the point scheme increments points for a first set of activities and decrements points for a second set of activities within the services exchange medium. The activity score is typically stored on a computing device. In some embodiments, the activity score is determined using on a rolling window. Prior to the calculating, the application determines a search score for each service provider based on the query. If the query is a user-entered search text, then the search score depends on a number of matches between the user-entered search text and a professional profile. Where the matches are located within the professional profile; the total score is a combination of the search score and the activity score. If the query is a system generated query to search for all service providers, then search score is set to a default value such that the activity score is a final determiner of rank in a results list. If the query is a system generated query to search for service providers associated with a job category, then the search score is set to a default value such that the activity score is a final determiner of rank in a results list. The method also includes sorting a results list based on the total score. In some embodiments, services providers associated with more than one job category are listed once in the results list. In some embodiments, the point scheme is tunable. In some embodiments, the point scheme does not cap a number of points the point scheme awards to service providers.

BRIEF DESCRIPTION OF THE DRAWINGS

FIG. 2 illustrates a professional profile in accordance with the present invention.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Reference will now be made in detail to implementations of the present invention as illustrated in the accompanying drawings. The same reference indicators will be used throughout the drawings and the following detailed description to refer to the same or like parts.

Embodiments of the present invention are directed to a method of and a system for ranking members within a services exchange medium. Members typically include service providers and buyers. In the services exchange medium, a buyer is able to search and hire service providers "on demand" to get projects done quickly and cost effectively. In the services exchange medium, a service provider is able to create a professional profile that describes the service provider's professional abilities. Preferably, the service provider is able to associate themselves with one or more job categories, such as Administrative Support and Legal. A buyer is able enter a search text in a search field, or activate a link to a particular job category or to all job categories, and then review professional profiles of those service providers returned as part of the search results to make an informed hiring decision.

Figure 1:
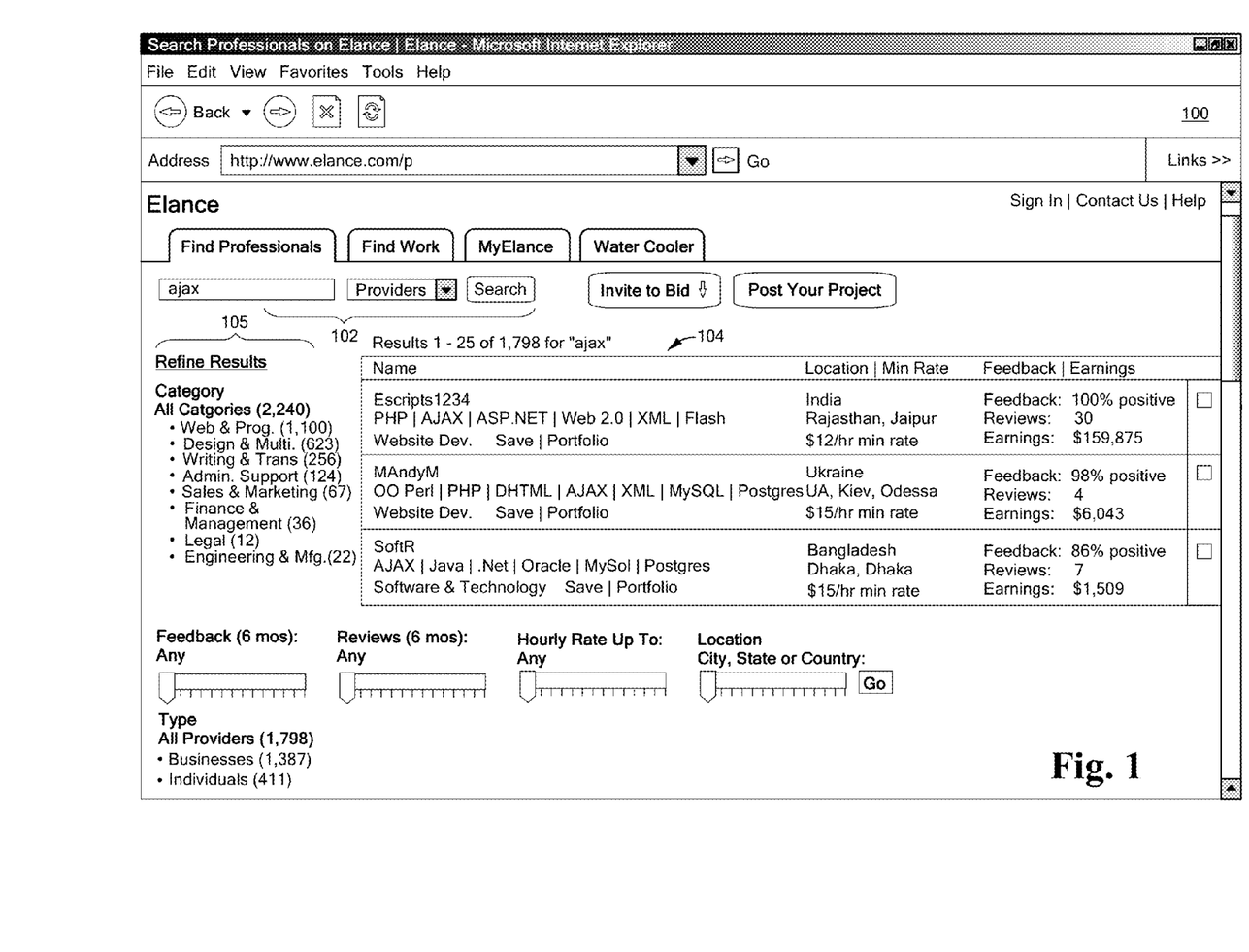
FIG. 1 illustrates a web page displaying a results list in accordance with the present invention.

FIG. 1 illustrates a web page 100 displaying a results list 104 in accordance with the present invention. As is well known, the appearance of a web page can be altered according to a variety of requirement for displaying information and for aesthetic reasons. Thus, the web page 100 is merely one example of a web page according to the present invention.

The web page 100 includes a search component 102 which allows a user to search for service providers. In some embodiments, the search component 102 includes a text box for entering text, a drop-down menu for selecting which type of profiles to search through and a command button for initiating the search. For example, if the user wants to search through all service providers, the user selects "providers" in the drop-down menu. The drop-down menu is able to include any set of profiles to search through, for example, service providers and projects. The search will return all service providers within the services exchange medium.

Alternatively, if the user then wants to search for service providers that have experience with the Ajax programming language, the user types the search term "ajax" in the text box. Then, the user presses "enter" or clicks on the command button to begin the search. The search will return all relevant service providers that have experience with the Ajax programming language.

Alternatively, the user is able to click on a specific job category 105 without entering search text. The search will return all service providers associated with that job category. Exemplary job categories include Web & Programming, Design & Multimedia, Writing & Translation, Administrative Support, Sales & Marketing, Finance & Management, Legal, and Engineering & Manufacturing. More or less categories are contemplated.

The results list 104 is displayed on the web page 100 and includes names of service providers and other pertinent data. The service providers returned as part of the results list 104 are preferably sorted in a significant manner useful to the user searching for a qualified service provider within the services exchange medium.

In some instances, the order in which the results list 104 is sorted depends solely on an activity score. In some instances, the order in which the results list 104 is sorted depends on a total score, which is a combination of a search score for the search results of the professional profile and an activity score. The combined score can be formed using a simple mathematical summation, a weighted summation or any predetermined means for forming a composite score. For example, the search score accounts for half of the total score and the activity score accounts for the other half of the total score for determining the order of the result list 104. Alternatively, the activity score enhances or amplifies the search score. The search score and the activity score are each described in turn below.

Search Score

FIG. 2 illustrates a professional profile 200 in accordance with the present invention. Like the web page 100 of FIG. 1, the appearance of the professional profile of FIG. 2 can be modified to display different information and/or for aesthetic reasons. Thus, the professional profile of FIG. 2 is merely exemplary.

If the user searches by entering a search term/phrase, then the search examines the text in each professional profile and determines if there is at least one match between the search term/phrase and the text. A search score is then determined for the result of the search of each service provider. The search score of the result typically depends on the number of matches and where the match or matches are located. As illustrated in FIG. 2, the professional profile 200 includes a "tagline" section 202, a "summary" section 204, an "experience" section 206, a "skills" section 210, a "keyword" section 208, an "about us" section 212, a "detailed description" section 214, a "certification" section 216 and other sections. In some embodiments, more or less sections are included. Each section has a value, and that value is applied toward the search score, if the search term/phrase is found within that section. The value for each section can be different and is tunable. For example, if the search term/phrase is found in the "skills" section 210, it is possible that this information is more valuable than if the searched text is found in the "about us" section 212. If the information is more valuable, the resulting score can result is a higher search score. Moreover, in some embodiments, additional details are taken into consideration to determine the search score, such as the number of years of experience with a certain skill, so that the more years a person or company has with a certain skill, the higher search score they will receive. The number of times the searched text is found is also able to contribute to a higher search score. The search score is combined with an activity score to determine rank in the results list 104.

In some embodiments, if the user simply clicked on a link to a specific job category or a link to all job categories, then the search score is set to a default value such that the activity score is the final determiner of rank in the results list 104.

Activity Score

In some embodiments, an activity score is determined for each service provider associated with each job category. In other words, if the service provider is associated with multiple job categories, the service provider will receive an activity score for each category.

The activity score is determined according to a point scheme. The point scheme allows service providers to earn points based on activities and achievements within the services exchange medium. The point scheme drives particular behaviors within the services exchange medium by rewarding points for certain behaviors and taking away points for other behaviors. For example, the point scheme rewards points to service providers who market their services effectively, deliver great work, maintain high levels of client (e.g., buyer) satisfaction and develop lasting client relationships within the services exchange medium. A service provider's activity score can become negative since the point scheme is able to deduct or take away points from the service provider. Point deduction is further discussed below.

In some embodiments, the point scheme does not cap the number of points it awards to service providers. Depending on how "active" a service provider is within the services exchange medium, the service provider is able to earn as many points as the service provider desires. Due to the competitive nature of service providers to obtain points (in order to be listed further on top of a results list to more likely win jobs within the services exchange medium), the point scheme helps better recognize and promote service providers who deliver great results. In some embodiments, the point scheme is tunable.

The point scheme is similar to a reward system implemented by a store. The more purchases a customer makes (e.g., activity/behavior), the more points the customer will accumulate. The accumulated points allow the customer to receive, for example, discounts on future purchases. The incentive motivates the purchaser to make even more purchases at the store (e.g., driving behavior). Similar to the reward system, the point scheme awards points to service providers for certain behavior within the services exchange medium.

In some embodiments, the point scheme is based on three performance indicators: service delivery, client relationships and marketing. However, the point scheme can be based on more or less performance indicators. In some embodiments, the activity score is a mathematical function of scores earned for each performance indicator (e.g., service delivery score, client relationships score, marketing score). Each performance indicator is, in turn, discussed below.

Service Delivery. Points under the service delivery category can be earned by using tools provided by and within the services exchange medium to complete jobs successfully, receiving feedback and/or getting paid through the services exchange medium. In some embodiments, service delivery metrics include earnings, feedback, status reports, cancellations, violations, and disputes. More or less service delivery metrics are contemplated.

The "earnings" metric is defined as all earnings within, for example, the past six months. The "earnings" metric is a positive metric, which contributes/adds to the service provider's service delivery points.

The "feedback" metric is defined as the number of final feedbacks received within, for example, the past six months. The "feedback" metric is also a positive metric, which contributes/adds to the service provider's service delivery points.

The "status report" metric is defined as the number of status reports submitted within, for example, the past six months. The "status report" metric is also a positive metic, which contributes/adds to the service provider's service delivery points. In some embodiments, points are only awarded if payment for a project associated with the status report is received.

The "cancellations" metric is defined as the number of job cancellations due to poor performance within, for example, the past six months. The "cancellations" metric is a negative metric, which takes away from the service provider's service delivery points. In some embodiments, service delivery points are reduced only for job cancellations due to poor performance from the service provider; other cancellations have no impact on the service delivery points.

The "violations" metric is defined as the number of policy violations within, for example, the past six months, across all categories in some embodiments. The "violations" metric is also a negative metric, which takes away from the service provider's service delivery points.

The "disputes" metric is defined as the number of disputes within, for example, the past six months. The "disputes" metric is also a negative metric, which takes away from the service provider's service delivery points.

To earn service delivery points (e.g., improve service delivery statistics), the service provider can use the tools provided by and within the services exchange medium, including workrooms and status reports. The tools typically provide a solution for managing online work, provide clients and service providers with a practical way to set up engagements, manage the work and exchange payment for results. For example, workrooms and status reports provide visibility and serve as an important reference for job progression. Other tools include job postings, milestones, tracker, one-click invoicing and escrow.

To earn service delivery points, the service provider can also send a "complete" status report after completion of a job, as it will prompt the client to leave a feedback.

In addition, the service provider can earn service delivery points when the service provider is paid through the services exchange medium. Earnings per client are important as they are a measure of the strength of the relationship and of the value exchanged between the service provider and the client over time on the services exchange medium. Service providers with high earnings per client are typically able to build solid relationships and typically deliver higher level of client satisfaction. By keeping clients on the services exchange medium, these service providers benefit the rest of the community within the services exchange medium.

To prevent service delivery points from being deducted, the service provider can avoid job cancellations. The service provider is thus encouraged to carefully consider jobs the service provider pursues to make sure that the service provider can meet or exceed client expectations.

To prevent service delivery points from being deducted, the service provider can also avoid policy violations.

In some embodiments, the service delivery score is derived by manipulating the points received for each service delivery metric using a predetermined means.

Client Relationships. Points under the client relationships category can be earned by building strong client relationships, which are a measure of the quality of services delivered. In some embodiments, client relationships metrics include client recommendations, earnings per client, number of clients, and repeat clients. More or less client relationship metrics are contemplated.

The "client recommendations" metric is defined as the percentage of clients who recommend the service provider. The "client recommendations" metric is a positive metric, which contributes/adds to the service provider's client relationships points.

The "earnings per client" metric is defined as the average earnings per client within, for example, the past 12 months. The "earnings per client" metric is also a positive metric, which contributes/adds to the service provider's client relationships points.

The "number of clients" metric is defined as the number of clients within, for example, the past 12 months. The "number of clients" metric is also a positive metric, which contributes/adds to the service provider's client relationships points.

The "repeat clients" metric is defined as the number of repeat clients within, for example, the past 12 months. The "repeat clients" metric is also a positive metric, which contributes/adds to the service provider's client relationships points.

To earn client relationships points (e.g., improve client relationships statistics), the service provider can meet or exceed expectations by delivering quality work on time and on budget, and by providing excellent customer service. Clients that are satisfied with their experience will typically indicate their willingness to recommend the service provider to others when they submit their final feedback.

To earn client relationships points, the service provider can also develop strong relationships with the service provider's clients. Repeat clients are good for the service provider and for the users within the services exchange medium. Keeping clients on the services exchange medium typically improves the service provider's earnings per client.

To earn client relationships points, the service provider can also develop new client relationship, by building a portfolio of active clients within the services exchange medium.

In some embodiments, the client relationships score is derived by manipulating the points received for each client relationships metric using a predetermined means.

Marketing. Points under the marketing category can be earned by creating strong profiles, submitting quality proposals for jobs relevant to their specific expertise, pricing their services within budget ranges and ensuring that the work is awarded on the services exchange medium. Typically, service providers who market themselves effectively help bring high quality work to the services exchange medium. In some embodiments, marketing metrics include bookings, job accept rate, tested skills, verified credentials, and proposals below budget. More or less marketing metrics are contemplated.

The "bookings" metric is defined as the value of accepted jobs within, for example, the past six months. In some embodiments, cancelled jobs are not counted. The "bookings" metric is a positive metric, which contributes/adds to the service provider's marketing points.

The "job accept rate" metric is defined as the percentage of jobs accepted within, for example, the past six months. The "job accept rate" metric is also a positive metric, which contributes/adds to the service provider's marketing points.

The "tested skills" metric is defined as the number of tested skills in the professional profile, across all categories in some embodiments. The "tested skills" metric is also a positive metric, which contributes/adds to the service provider's marketing points.

The "verified credentials" metric is defined as the number of verified credentials in the profile, across all categories in some embodiments. In some embodiments, personal credentials are not counted. The "verified credentials" metric is also a positive metric, which contributes/adds to the service provider's marketing points.

The "proposals below budget" metric is defined as the number of proposals priced below budget within, for example, the past six months. The "proposals below budget" metric is a negative metric, which takes away points from the service provider's marketing points. In contrast, points are awarded those proposals priced within and/or above budget within, for example, the past six months.

To earn marketing points (e.g., improve marketing statistics), the service provider can submit high quality proposals, particularly proposals that reflect a clear understanding of the job requirements and set realistic expectations.

To earn marketing points, the service provider can also set a price within the budge range indicated by the client. However, if the service provider submits a proposal below budge, then the service provider is penalized. In general, low-ball bidding within the services exchange medium leads to price erosion.

To earn marketing points, the service provider can also create a strong professional profile by, for example, adding tested skills when available and verifying credentials. Professional profiles with tested skills and verified credentials typically win more business within the services exchange medium; thus, it is beneficial to promote these professional profiles since they do a better job converting prospective clients into long-term employers within the services exchange medium.

In some embodiments, the marketing score is derived by manipulating the points received for each marketing metric using a predetermined means.

Scoring Details

The service delivery score, the client relationships score and the marketing score are mathematically combined to obtain the service provider's activity score using a predetermined means. In some embodiments, the point scheme is category-specific, which advantageously allows the service provider to see how well the service provider is doing relative to other service providers within each job category that the service provider is associated with.

Figure 3:
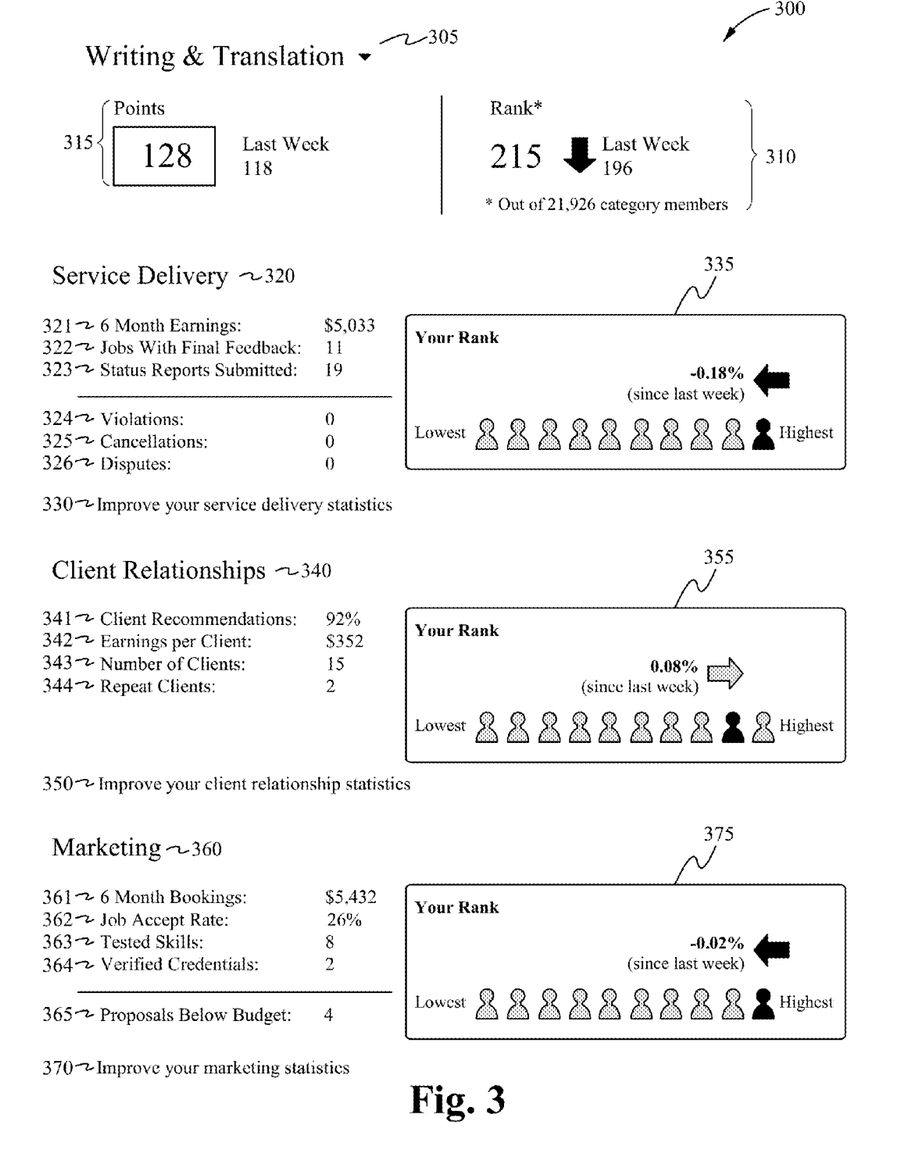
FIG. 3 illustrates an exemplary chart displaying scoring details in accordance with the present invention.

FIG. 3 illustrates an exemplary chart 300 displaying scoring details in accordance with the present invention. Like the web page 100 of FIG. 1, the appearance of the chart of FIG. 3 can be modified to display different information and/or for aesthetic reasons. Thus, the chart of FIG. 3 is merely exemplary.

Typically, the chart 300 tracks the service providers's activities and achievements within a job category. In this example, the chart 300 displays information regarding the job category of Writing & Translation, which is selected using a drop-down menu 305. The drop-down menu 305 allows the service provider to see scoring details for other job categories that the service provider is associated with.

The chart 300 also includes a rank section 310. The rank section 310 displays the service provider's current rank among all members associated with the Writing & Translation job category. The ranking within the specific job category is typically based on the activity points earned. The rank section 310 also displays the service provider's rank from the week before. In some embodiments, the rank section 310 also graphically illustrates, using an arrow, whether the service provider's current rank went up or down within the job category. In some embodiments, the rank section 310 also display the number of current members within the job category. In this example, the service provider went down in rank from the previous week (e.g., from 196 to 215) in the Writing & Translation job category.

The chart 300 also includes a score section 315. The score section 315 displays the service provider's current activity score and the activity score from the previous week. In some embodiments, the last two digits of the activity score are dropped when the activity score is displayed. For example, an activity score of 12342 is displayed as 123; an activity score of 199 is displayed as 1; an activity score of 99 is displayed as 0; an activity score of −55 is displayed as 0; and, an activity score of −100 is displayed as −1. As discussed above, since the point scheme deducts point points away for certain activities and behavior within the services exchange medium, it is possible for the service provider to have negative points.

In this example, the service provider earned points for activities and achievements within the services exchange medium during the week, thereby increasing the activity score from 118 to 128. However, since other service providers associated with the Writing & Translation job category were more "active" than the service provider was during the week, the service provider's rank went down since the previous week.

Points are earned under the performance indicators-service delivery 320, client relationships 340 and marketing 360. These points help determine the service provider's rank in search results. Each of the performance indicators is associated with an improve statistics link 330, 350, 370 and a ranking chart 335, 355, 365. Clicking on an improve statistics link 330, 350, 370 allows the service provider to view ways to improve statistics (e.g., to earn points) for the particular performance indicator. Ways to earn points or improve earnings for each of the performance indicators are discussed above. The ranking chart 335, 355, 375 graphically illustrates the service provider's rank among the service providers associated with the job category for the particular performance indicator, which is based on the points earned for that performance indicator. The ranking chart 335, 355, 375 also numerically and/or graphically shows how much (percentage-wise) the service provider's rank has increased or decreased from the week before for the particular performance indicator.

Under the service delivery indicator 320, information for the different service delivery metrics are displayed. Particularly, the earnings metric 321, the feedback metric 322, the status reports metric 323, the violations metric 324, the cancellations metric 325, and the disputes metric 326 are displayed. As discussed above, more or less service delivery metrics are contemplated.

Under the client relationships indicator 340, information for the different client services metrics are displayed. Particularly, the client recommendations metric 341, the earnings per client metric 342, the number of clients metric 343, and the repeat clients metric 344 are displayed. As discussed above, more or less client relationships metrics are contemplated.

Under the marketing indicator 360, information for the different marketing metrics are displayed. Particularly, the bookings metric 361, the job accept rate 362, the tested skills metric 363, the verified credentials metric 364, and the proposals below budget metric 365 are displayed. As discussed above, more or less marketing metrics are contemplated.

In some embodiments, the chart 300 is viewable by the service provider within the professional profile. Alternatively or in addition, the chart 300 is displayed in proposals submitted by the service provider and, as such, is viewable by clients.

In some embodiments, the activity score is calculated periodically (e.g., on a weekly basis) using a rolling window (e.g., the past six months). All calculations are preferably stored in a data source coupled to or within the services exchange medium to provide historical views to the service providers. Since the activity score is periodically calculated, it is already determined and made available when computing a total score.

Results List

In some instances, the order in which the results list 104 is sorted depends on the total score, which is a combination of the search score and the activity score. The combined score can be formed using a simple mathematical summation, a weighted summation or any predetermined means for forming a composite score.

Referring back to FIGS. 1-2, assuming the user searches by entering "Ajax" in the text box, the search examines the text in each professional profile and determines if there is at least one match between the "Ajax" and the text. Particularly, the search examines the "tagline" section 202, the "summary" section 204, the "experience" section 206, the "skills" section 210, the "keyword" section 208, the "about us" section 212, the "detailed description" section 214, the "certification" section 216 and other sections of each professional profile 200 to determine a search score for the corresponding service provider. Concurrently or after the search scores are determined, the total score for each service provider are determined, by combining the service provider's search score with the predetermined (e.g., weekly calculated) activity score. The service providers are then sorted according to the total score. In some embodiments, for those service providers who are associated with more than one job category, only one activity score is used to determine their total score. Typically, the highest activity score is used to calculate the total score.

In some instances, the order in which the results list 104 is sorted depends solely on the activity score. As discussed above, if the user searches for service providers across all job categories or searches for service providers associated with a particular job category, then a search score is set to a default value such that the activity score is the final determiner of rank in the results list 104. In some embodiments, the search score is not determined for each service provider since no search term/phrase was entered.

In the scenario where the user searches for service providers across all job categories those service providers who are associated with more than one job category will be listed once, typically based on their highest activity score. Since points awarded are dependent on, for example, earnings and there is no cap on earnings, service providers associated with certain job categories (e.g., Web & Programming) tend to earn more points than those associated with other job categories (e.g., Writing & Translation). Since the same activity scores are used when ranking service providers associated with a particular job category and when ranking service providers across all job categories, service providers associated with the Writing & Translation job category tend to be listed towards the end of the results list 104 compared to those service providers associated with the Web & Programming job category. For example, although the service provider is ranked 215 in the Writing & Translation job category (FIG. 3), the service provider may be ranked 802,937 across all job categories.

In Operation

Figure 4:
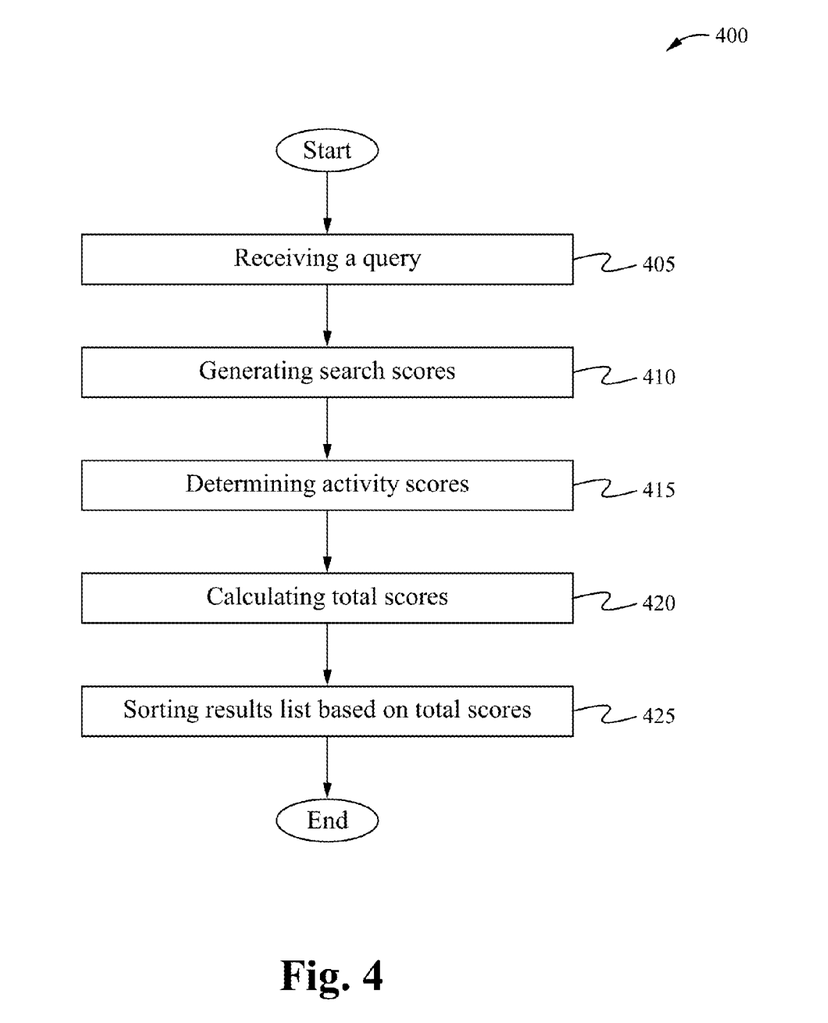
FIG. 4 illustrates a flowchart of a process of searching for service providers in accordance with the present invention.

FIG. 4 illustrates a flowchart of a process 400 of searching for service providers in accordance with the present invention. The process 400 begins at a Step 405, where the services exchange medium receives a search query. As discussed above, the search query can be (1) a user entered search term/phrase, (2) a system generated query for all service providers, or (3) a system generated query for service providers associated with a particular job category.

At a Step 410, search scores are generated. If the user searches by entering a search term/phrase, then a search score is determined for the result of the search of each service provider. The search examines the text in each professional profile and determines if there is at least one match between the search term/phrase and the text. The search score of the result typically depends on the number of matches and where the match or matches are located. Alternatively, if the user simply clicked on a specific category or on all categories without providing a search term/phrase, then the search score is set to a default value such that the activity score is the final determiner of rank in the results list.

At a Step 415, activity scores are determined. In some embodiments, activity scores are calculated periodically (e.g., weekly). As such, the Step 415 can occur before the Step 405, the Step 410, or both.

At a Step 420, total scores are calculated. As discussed above, a total score is a combination of a search score for the search results of a professional profile and an activity score. The combined score can be formed using a simple mathematical summation, a weighted summation or any predetermined means for forming a composite score. For example, the search score accounts for half of the total score and the activity score accounts for the other half of the total score for determining the order of the result list. Alternatively, the activity score enhances or amplifies the search score. In instances where a service provider is associated with more than one job category, then the highest activity score is used to determine the service provider's total score.

At a Step 425, a results list is displayed. The results list is sorted by the total score. After the Step 425, the process ends.

The steps of the present invention are embodied in machine-executable instructions. These instructions can be used to cause a general-purpose or special-purpose processor that is programmed with the instructions to perform the steps of the present invention. Alternatively, the steps of the present invention can be performed by specific hardware components that contain hardwired logic for performing the steps, or by any combination of programmed computer components and custom hardware components.

Figure 5:
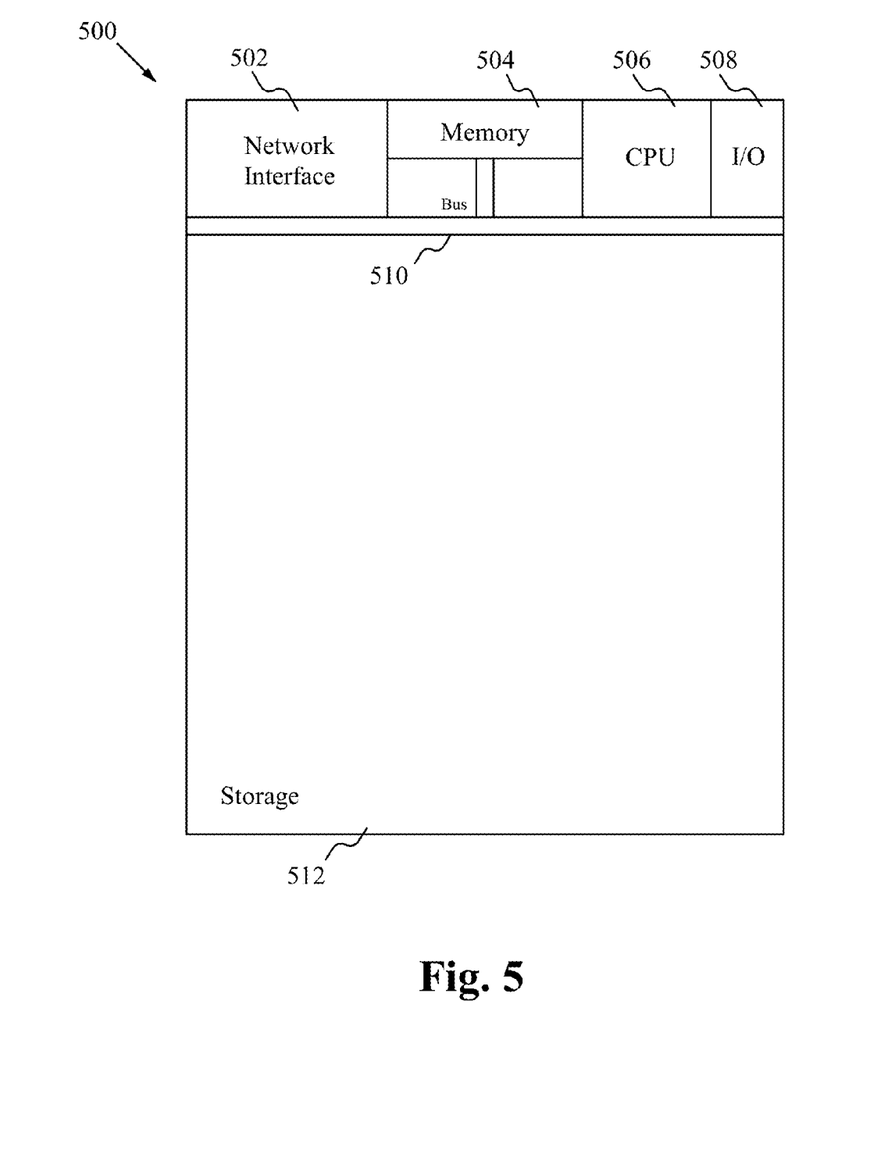
FIG. 5 illustrates a graphical representation of an exemplary computing device in accordance with the present invention.

In some embodiments, the present invention is provided as a computing device. FIG. 5 illustrates a graphical representation of an exemplary computing device 500 in accordance with the present invention. The computing device 500, such as a server stores, serves, computes, communicates, generates and/or displays information about the service provider within the services exchange medium. The service provider uses an Internet-ready device, such as a personal computer, to interact with the computer device 500 to create the profile. In general, a hardware structure suitable for implementing the computing device 500 includes a network interface 502, a memory 504, processor 506, I/O device(s) 508, a bus 510 and a storage device 512. The choice of processor is not critical as long as the processor 506 has sufficient speed. The memory 504 is any conventional computer memory known in the art. The storage device 512 is a hard drive, CDROM, CDRW, DVD, DVDRW, flash memory card or any other storage device. The computing device is able to include one or more network interfaces 502. An example of a network interface includes a network card connected to an Ethernet or other type of LAN. The I/O device(s) 508 are able to include one or more of the following: keyboard, mouse, monitor, display, printer, modem and other devices. Software used to create the online professional badge is likely to be stored in the storage device 512 and memory 504 and processed as an application is typically processed.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to a method of ranking within a services exchange medium will occur. Consequently, the claims should be broadly construed, consistent with the spirit and scope of the invention, and should not be limited to their exact, literal meaning.

We claim:

1. A computerized method of generating a results list comprising:
   a. determining a search score for each service provider using a search text, wherein the search score depends on a number of matches between the search text and a professional profile, wherein the matches are located within the professional profile;
   b. periodically determining an activity score according to a point scheme for each category associated with each service provider, wherein the activity score comprises a calculation combining a plurality of performance indicator scores for a plurality of performance indicators, wherein the plurality of performance indicators include service delivery, client relationships and marketing and the score for each performance indicator determines a service provider's rank among all service providers associated with the category for that performance indicator, wherein the performances indicator scores are based on a rolling time window of a predetermined range of time stretching back in time from the present such that data in the range are considered and data outside the range are not considered in the determination of the activity score, wherein the point scheme increments points for a first set of activities and decrements points for a second set of activities within a services exchange medium, wherein the activity score is stored on a computing device, wherein the first set of activities includes complete jobs successfully, receiving feedback, and getting paid through the services exchange medium and the second set of activities includes violating policies, engaging in disputes with other members, and submitting proposals below budget;

c. upon receiving a query, calculating a total score by combining the search score and the activity score, and wherein if the query is a system generated query to search for all service providers, then the search score is set to a default value such that the activity score is a final determiner of rank in a results list; and d. sorting the results list on a display based on the total score, wherein services providers associated with more than one job category are listed once in the results list.

2. The computerized method of claim 1, wherein the query is a query to search for service providers associated with a job category.

3. The computerized method of claim 1, wherein the point scheme is tunable.

4. The computerized method of claim 1, wherein service providers returned in the results list are associated with a job category.

5. The computerized method of claim 1, wherein service providers returned in the results list are from all job categories.

6. The computerized method of claim 1, wherein a service provider associated with more than one job has more than one activity score, wherein the sorting includes selecting the highest activity score to determine the total score.

7. The computerized method of claim 1, wherein the activity score establishes a different rank position in a subsequent results list than the rank position in the results list.

8. A non-transitory computer-readable medium storing instructions that, when executed by a computing device, cause the computing device to perform a method to determine rank of service providers, the method comprising:

a. calculating an activity score according to a point scheme for each category associated with each service provider, wherein the activity score comprises a combination of a plurality of performance indicator scores for a plurality of performance indicators, wherein the plurality of performance indicators include service delivery, client relationships and marketing and the score for each performance indicator determines a service provider's rank among all service providers associated with the category for that performance indicator, wherein the performance indicator scores are based on a sliding time window of a predetermined range of time stretching back in time from the present such that data outside of the sliding time window are not considered in the calculation of the activity score, wherein the point scheme increments points for a first set of activities and decrements points for a second set of activities within a services exchange medium, wherein the activity score is stored on a computing device, wherein the first set of activities includes complete jobs successfully, receiving feedback, and getting paid through a services exchange medium and the second set of activities includes violating policies, engaging in disputes with other members, and submitting proposals below budget;

b. upon receiving a search query, determining a search score for each service provider using a search text, wherein the search score depends on a number of matches between the search text and a professional profile belonging to the service provider, wherein the matches are located within the professional profile;

c. combining the activity score with the search score, thereby resulting in a total score, wherein the total score establishes a rank position of the service provider among service providers returned in a first results list, and wherein if the query is a system generated query to search for all service providers, then the search score is set to a default value such that the activity score is a final determiner of rank in the first results list; and d. sorting the first results list on a display based on the total score, wherein services providers associated with more than one job category are listed once in the first results list.

9. The non-transitory computer-readable medium of claim 8, wherein service providers returned in the first results list are associated with a job category.

10. The non-transitory computer-readable medium of claim 8, wherein service providers returned in the first results list are from all job categories.

11. The non-transitory computer-readable medium of claim 8, wherein the activity score establishes a different rank position in a second results list than the rank position in the first results list.

12. The non-transitory computer-readable medium of claim 8, wherein the point scheme is tunable.

13. The non-transitory computer-readable medium of claim 8, wherein a service provider associated with more than one job has more than one activity score, wherein the sorting includes selecting the highest activity score to determine the total score.

14. A system for generating a provider results list comprising:

a. a processor; and b. an application executed by the processor, the application for:

1. determining a search score for each service provider based on a search text, wherein the search score depends on a number of matches between the search text and a professional profile, wherein the matches are located within the professional profile;

2. periodically determining an activity score according to a point scheme for a category associated with a service provider, wherein the activity score is a function of performance scores associated with a plurality of performance indicators for a plurality of performance indicators, wherein the plurality of performance indicators include service delivery, client relationships and marketing and the score for each performance indicator determines the service provider's rank among all service providers associated with the category for that performance indicator, wherein each performance score is based on a rolling time window of a predetermined range of time such that data in the range are considered and data outside of the range are not considered in the determination of the activity score, wherein the point scheme increments points for a first set of activities and decrements points for a second set of activities within a services exchange medium, wherein the activity score is stored on a computing device, wherein the first set of activities includes complete jobs successfully, receiving feedback, and getting paid through a services exchange medium and the second set of activities includes violating policies, engaging in disputes with other members, and submitting proposals below budget; and 3. upon receiving a query, calculating a total score for the category based on the activity score and the search score, and wherein if the query is a system generated query to search for all service providers, then the search score is set to a default value such that the activity score is a final determiner of rank in a results list; and 4. sorting the results list on a display based on the total score, wherein services providers associated with more than one job category are listed once in the results list.

15. The system of claim 14, wherein the query is not associated with any user input, and the total score is a final determiner of rank in the results list.

16. The system of claim 14, wherein the total score is used for ranking the service provider among all service providers associated with the category.

17. The system of claim 14, wherein the total score is used for ranking the service provider among all service providers associated with a services exchange medium.

18. The system of claim 14, wherein the activity score is determined using data that are not used in a later determination.

19. The system of claim 14, wherein the point scheme does not cap a number of points the point scheme awards to service providers.

20. The system of claim 14, wherein the point scheme is tunable.

* * * * *

UNITED STATES PATENT AND TRADEMARK OFFICE
CERTIFICATE OF CORRECTION

| | | |
|---|---|---|
| PATENT NO. | : 8,700,614 B1 | Page 1 of 1 |
| APPLICATION NO. | : 12/755304 | |
| DATED | : April 15, 2014 | |
| INVENTOR(S) | : Jonathan Paul Diller | |

It is certified that error appears in the above-identified patent and that said Letters Patent is hereby corrected as shown below:

On the Title Page, Item (56)

IN THE REFERENCES CITED - OTHER PUBLICATIONS - p. 2

Replace "12/476,069" with –12/476,039–

Signed and Sealed this
Twenty-second Day of July, 2014

Michelle K. Lee
*Deputy Director of the United States Patent and Trademark Office*